(12) United States Patent
Fukawatase et al.

(10) Patent No.: US 7,959,184 B2
(45) Date of Patent: Jun. 14, 2011

(54) FRONT PASSENGER SEAT AIR BAG APPARATUS

(75) Inventors: Osamu Fukawatase, Nishikamo-gun (JP); Tomotaka Kuroda, Okazaki (JP); Muneo Akashio, Aichi-ken (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 12/550,606

(22) Filed: Aug. 31, 2009

(65) Prior Publication Data
US 2010/0052297 A1  Mar. 4, 2010

(30) Foreign Application Priority Data
Sep. 1, 2008  (JP) ................................ 2008-223587

(51) Int. Cl.
 *B60R 21/16* (2006.01)
 *B60R 21/276* (2006.01)
(52) U.S. Cl. ..................................... 280/739; 280/743.2
(58) Field of Classification Search .................. 280/732, 280/739, 742, 743.1, 743.2
 See application file for complete search history.

(56) References Cited

U.S. PATENT DOCUMENTS

| | | | |
|---|---|---|---|
| 6,139,048 A | 10/2000 | Braunschadel | |
| 6,945,559 B2 * | 9/2005 | Kassman et al. | 280/735 |
| 7,347,450 B2 | 3/2008 | Williams et al. | |
| 7,597,356 B2 * | 10/2009 | Williams | 280/739 |
| 7,614,653 B2 * | 11/2009 | Rose et al. | 280/739 |
| 7,614,654 B2 * | 11/2009 | Williams | 280/743.1 |
| 7,770,926 B2 * | 8/2010 | Schneider et al. | 280/743.2 |
| 2005/0040634 A1 | 2/2005 | Braun et al. | |

FOREIGN PATENT DOCUMENTS

| | | |
|---|---|---|
| JP | 11222097 A | 8/1999 |
| JP | 2000-142307 A | 5/2000 |
| JP | 2003137060 A | 5/2003 |
| JP | 2003260996 A | 9/2003 |
| JP | 2004262432 A | 9/2004 |
| JP | 2007084063 A | 4/2007 |
| JP | 2007099103 A | 4/2007 |
| JP | 2007099104 A | 4/2007 |
| JP | 2008143509 A | 6/2008 |
| JP | 2009227180 A | 10/2009 |

* cited by examiner

*Primary Examiner* — Paul N Dickson
*Assistant Examiner* — Joseph Rocca
(74) *Attorney, Agent, or Firm* — Gifford, Krass, Sprinkle, Anderson & Citkowski, P.C.

(57) ABSTRACT

A passenger seat air bag apparatus includes an air bag which is housed folded inside an instrument panel, and inflates toward a passenger who is seated in a front passenger seat with a supply of gas during a frontal collision, and which has a vent hole that can be opened and closed; a first strap which is connected to both an area around the vent hole and a rear lower portion of a base cloth of the air bag in the longitudinal direction of the vehicle, and which closes the vent hole as the air bag inflates; and a second strap which is connected to an edge portion of the vent hole, and pulls on the edge portion of the vent hole and on the first strap around the vent hole so as to open the vent hole when the passenger who is wearing a seatbelt is restrained by the air bag.

12 Claims, 10 Drawing Sheets

FRONT PASSENGER SEAT AIR BAG APPARATUS

INCORPORATION BY REFERENCE

The disclosure of Japanese Patent Application No. 2008-223587 filed on Sep. 1, 2008 including the specification, drawings and abstract is incorporated herein by reference in its entirety.

BACKGROUND OF THE INVENTION

1. Field of the Invention

The invention relates to a front passenger seat air bag apparatus.

2. Description of the Related Art

U.S. Pat. No. 7,347,450 describes a front passenger seat air bag apparatus with a variable vent hole, in which a vent hole that is open when an air bag begins to inflate is closed by a strap as the air bag inflates. With this front passenger seat air bag apparatus, the strap is connected to the vent hole and a lower portion of the air bag that is toward the rear of the vehicle when the air bag is inflated.

When a vehicle that is equipped with a front passenger seat air bag apparatus is involved in a frontal collision, the passenger seated in the front passenger seat is restrained by an air bag that inflates and deploys between the passenger and the instrument panel. In this case, when a passenger seated in the front passenger seat is not wearing a seatbelt in a country or region where it is not mandatory to wear a seatbelt in the front passenger seat, inertia will cause the entire body of the passenger to move forward relative to the vehicle, so the entire upper body of the passenger will strike the air bag. The structure described in the related art above is designed so that when the entire upper body of the passenger strikes the air bag in this way, the strap that is connected to the lower rear portion of the air bag will go slack and the vent hole will open due to the rise in internal pressure from restraining the passenger.

However, when a passenger seated in the front passenger seat is wearing a seatbelt, the lower portion of the upper body of the passenger is inhibited from moving forward relative to the vehicle. Therefore, with the structure of the related art described above, the strap is less apt to go slack so the vent hole will not open as easily.

SUMMARY OF THE INVENTION

This invention provides a front passenger seat air bag apparatus that is able to make the reaction force of an air bag when restraining a front seat passenger appropriate, regardless of whether the front seat passenger is wearing a seatbelt.

One aspect of the invention relates to a front passenger seat air bag apparatus that includes an air bag which is housed folded inside an instrument panel, and inflates and deploys toward a passenger who is seated in a front passenger seat with a supply of gas during a frontal collision, and which has a vent hole that can be opened and closed; a first strap which is connected to both an area around the vent hole and a rear lower portion of a base cloth of the air bag in the longitudinal direction of the vehicle, and which closes the vent hole as the air bag inflates; and a second strap which is connected to an edge portion of the vent hole, and pulls on the edge portion of the vent hole and on the first strap around the vent hole so as to open the vent hole when the passenger who is wearing a seatbelt is restrained by the air bag.

With the front passenger seat air bag apparatus according to this aspect, during a frontal impact of the vehicle, the air bag which is housed folded inside the instrument panel is supplied with gas so that it inflates toward a passenger seated in the front passenger seat. As the air bag inflates at this time, the first strap which is connected to the area around the vent hole and the rear lower portion of the base cloth of the air bag in the longitudinal direction of the vehicle starts to close the vent hole. As a result, it becomes difficult for the gas supplied into the air bag to escape. Therefore, when a passenger seated in the front passenger seat is not wearing a seatbelt in a country or region where it is not mandatory to wear a seatbelt in the front passenger seat, a sufficient amount of reaction force against the passenger is able to be ensured to appropriately restrain the passenger.

On the other hand, when a passenger seated in the front passenger seat is wearing a seatbelt and that passenger is restrained by the air bag, the second strap pulls on the edge portion of the vent hole as well as on the first strap, such that the vent hole that was closed (or in the process of being closed) by the operation of the first strap is opened again. As a result, it becomes easier for the gas inside the air bag to escape through the vent hole, so when a passenger seated in the front passenger seat is wearing a seatbelt, the reaction force against that passenger can be reduced, thus enabling that passenger to be appropriately restrained.

In this way, with the front passenger seat air bag apparatus of the foregoing aspect, the reaction force of the air bag when a passenger in the front passenger seat is restrained can be made appropriate, regardless of whether the passenger is wearing a seatbelt.

Also, in the front passenger seat air bag apparatus of the aspect described above, the rear portion of the second strap may extend in the vehicle width direction along a rear face of the base cloth which faces the passenger, at a height position where the upper body of the passenger who is wearing the seatbelt strikes the air bag.

With the front passenger seat air bag apparatus according to this structure, the rear portion of the second strap extends in the vehicle width direction along the rear face of the base cloth that faces the passenger at a height position where the upper body of the passenger wearing a seatbelt will strike the air bag. Therefore, when the passenger is restrained by the air bag, the inertia force of the passenger is directly input to the second strap. As a result, the second strap pulls forcefully on the edge portion of the vent hole and the first strap, thereby more quickly opening the vent hole that had been closed, or in the process of being closed, by the operation of the first strap.

Also, in the front passenger seat air bag apparatus of the aspect described above, the vent hole may be provided in a side face of the base cloth of the air bag in the vehicle width direction when the air bag is in a deployed state. Moreover, a guide portion, which guides the second strap such that a portion of the second strap along the side face is pulled toward the rear of the vehicle when the passenger who is wearing the seatbelt is restrained by the air bag, may be provided on an inside surface of the side face in a position that is farther toward the rear of the vehicle than the vent hole.

With the front passenger seat air bag apparatus according to this structure, the vent hole is provided in a side face of the base cloth of the air bag in the vehicle width direction when the air bag is in a deployed state. Further, a guide portion that guides the second strap is provided on the inside surface of the side face in a position that is farther toward the rear of the vehicle than the vent hole. Therefore, even if the rear face of the base cloth that faces the passenger is pushed forward in the longitudinal direction of the vehicle from the inertia force of the passenger, the portion of the second strap that is positioned along the side face of the air bag will be smoothly pulled toward the rear of the vehicle when the passenger wearing a seatbelt is restrained by the air bag. As a result, the edge portion of the vent hole and the first strap will be pulled toward the rear of the vehicle, such that the vent hole which had been closed, or in the process of being closed, by the operation of the first strap opens again. In this away, with the front passenger seat air bag apparatus having this structure, the operation of the second strap when the passenger wearing a seatbelt is restrained by the air bag is able to be even smoother.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
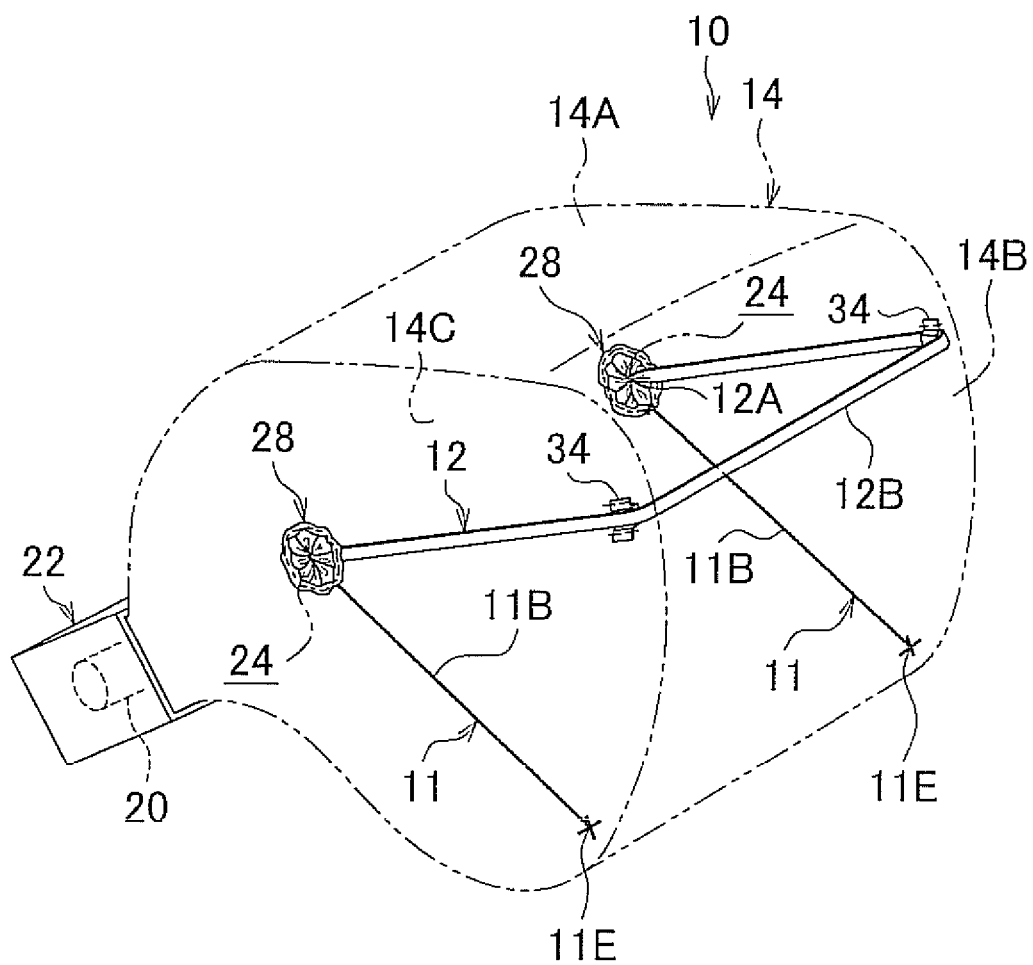
FIG. 1 shows a perspective view of a front passenger seat air bag apparatus as it appears when an air bag is completely deployed and vent holes are closed.

Example embodiments of the present invention will be described in greater detail below with reference to the accompanying drawings. In FIG. 1, a front passenger seat air bag apparatus 10 according to a first example embodiment includes an air bag 14 having vent holes 24, first straps 11, and a second strap 12.

Figure 6:
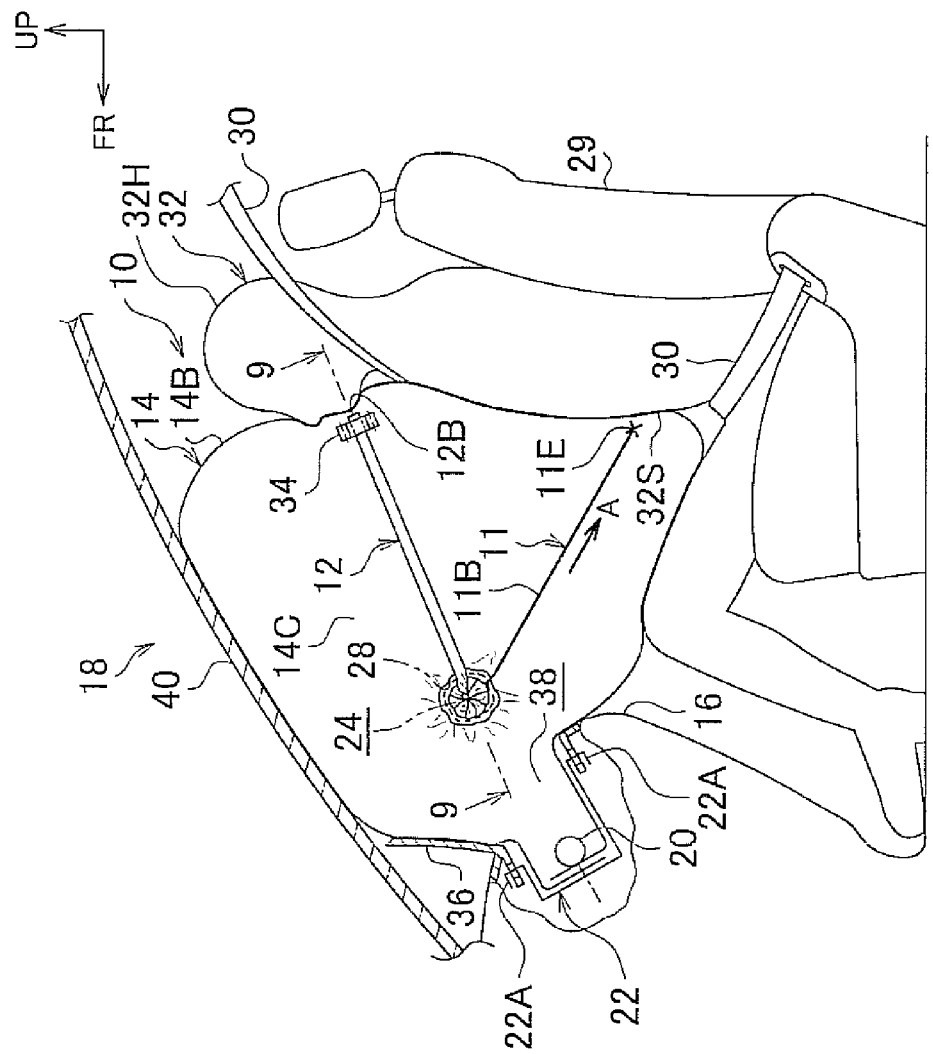
FIG. 6 shows a side view of the air bag expanding toward the passenger from inside the instrument panel, and inflating and deploying into the space between the front windshield, the instrument panel, and the passenger, with the vent holes closed.

The air bag 14 is normally housed folded inside an instrument panel 16. During a frontal collision of a vehicle 18, the air bag 14 is supplied with gas from an inflator 20, for example, so that it inflates and deploys toward a passenger 32 seated in a front passenger seat 29, as shown in FIG. 6. The air bag 14 and the inflator 20 are normally housed in a module case 22 which is arranged in the instrument panel 16. A plurality of pawl portions 22A are formed on the module case 22. These pawl portions 22A are engaged with the instrument panel 16. An open portion of the module case 22, which is the opening through which the air bag 14 inflates and deploys, is provided in the surface of the instrument panel 16 as well as inside the instrument panel 16. Normally, this open portion is closed off by the instrument panel 16 and a door substrate or the like, not shown, that opens from the pressure of the air bag 14 when it inflates. The area of the instrument panel 16 which corresponds to the open portion of the module case 22 is able to deploy by a designed breakaway portion, not shown, tearing from the pressure of the air bag 14 when it inflates.

Figure 2:
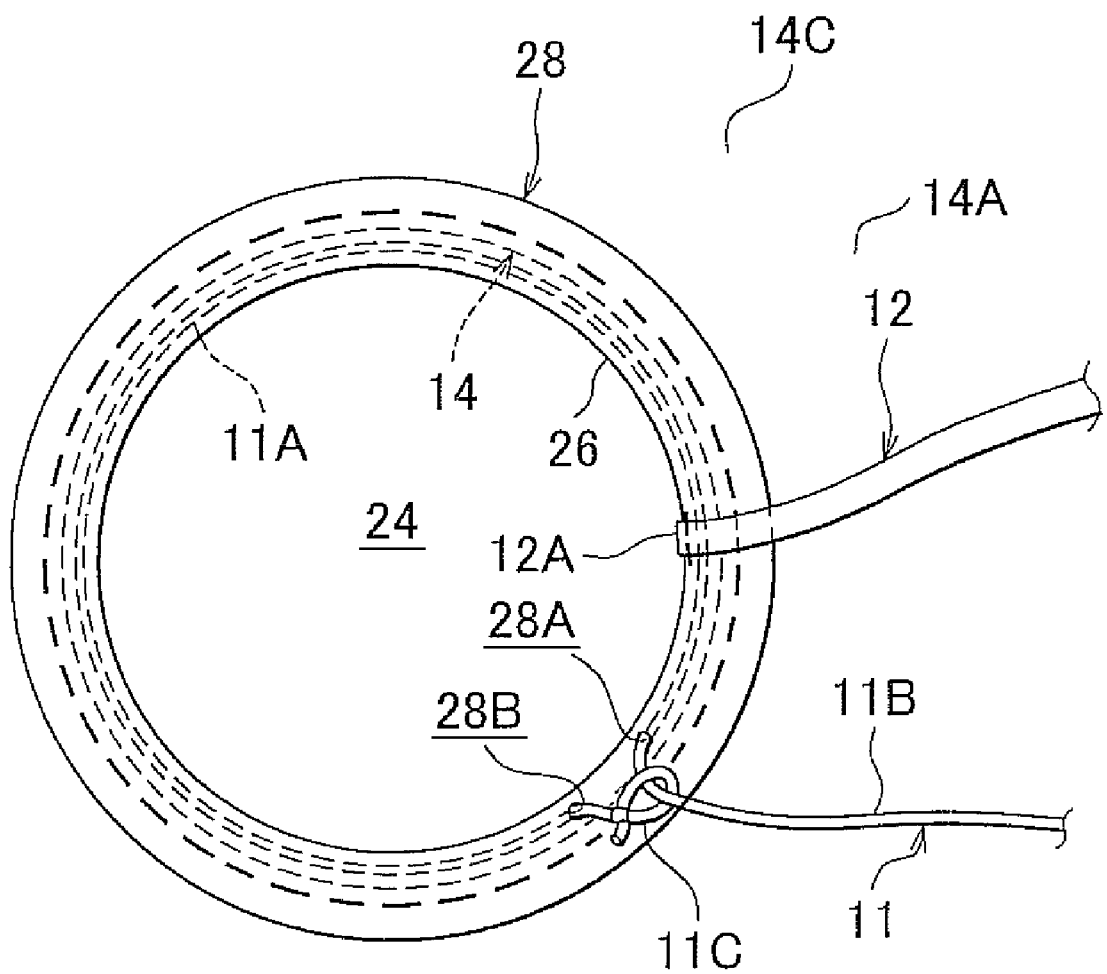
FIG. 2 shows an enlarged front view of an open vent hole and first and second straps near the vent hole.
Figure 3:
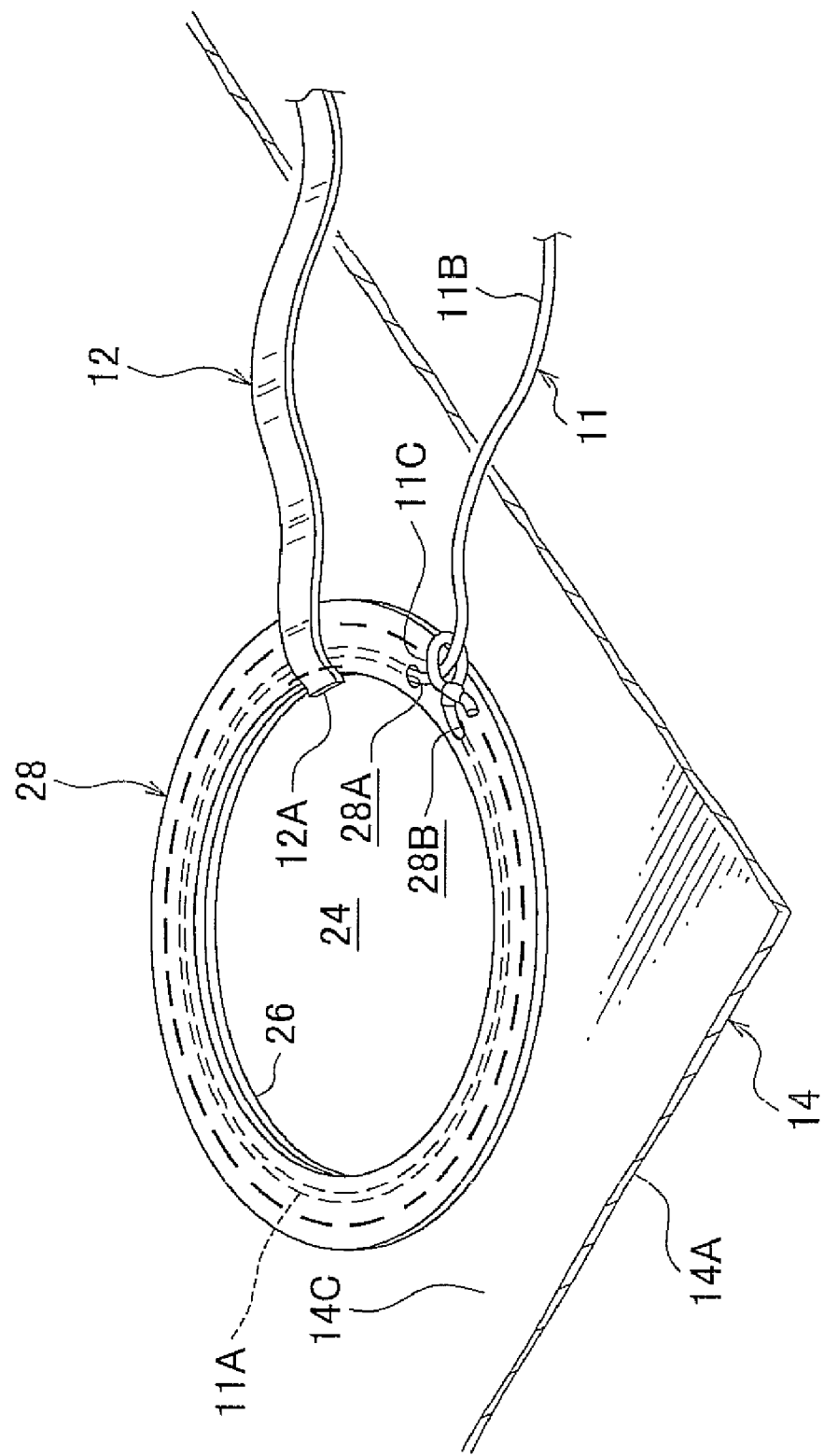
FIG. 3 shows an enlarged perspective view of the open vent hole and the first and second straps near the vent hole.

Also, a base cloth 14A of the air bag 14 includes a rear face 14B that faces the passenger and side faces 14C that face each other in the vehicle width direction when the air bag 14 is deployed. Further, the air bag 14 has vent holes 24 that can be opened and closed. One vent hole 24 is provided in the side face 14C on each side, for example, in the vehicle width direction of the air bag 14. To simplify the description, only one of these vent holes 24 will be described. The other vent hole 24 is understood to have the same structure unless otherwise stated. The vent hole 24 in each side face 14C is located in a portion that is toward the front of the air bag 14 in the longitudinal direction of the vehicle, for example. As shown in FIGS. 2 and 3, the vent hole 24 is circular in shape, for example. An annular filler cloth 28 is sewn in a pouch shape to the base cloth 14A of an edge portion 26 of the vent hole 24. This filler cloth 28 is made out of same material as the base cloth 14A of the air bag 14, for example.

An inflator 20, which is a gas producing device that supplies gas for inflating the air bag 14 to the air bag 14 in the event of a frontal collision of the vehicle 18, is connected to an air bag ECU, not shown, via a wire harness, also not shown. This inflator 20 is activated by an activation current supplied by the air bag ECU, and upon activation, supplies gas for inflating the air bag 14 to the air bag 14. When the air bag ECU determines that there has been a frontal collision of the vehicle 18 based on a signal received from an impact sensor, not shown, the air bag ECU sends the activation current to the inflator 20.

As shown in FIGS. 2, 3, and 6, the first strap 11 is connected to an area around the vent hold 24 and a rear lower portion of the side surface 14C of the air bag 14, and is designed to close the vent hole 24 as the air bag 14 inflates. A rear end 11E of the first strap 11 is connected by stitching, for example, to a rear lower portion of the side surface 14C of the air bag 14 in the longitudinal direction of the vehicle. As shown in FIG. 6, the rear end 11E of the first strap 11 is connected to the rear lower portion of the side surface 14C at a height that corresponds to the height of the abdomen 32S of the passenger 32, for example, when the air bag 14 is inflated and deployed.

More specifically, as shown in FIGS. 2 and 3, the first strap 11 is a non-elastic rope-shaped member. A ring-shaped portion 11A formed by a slip knot is formed on the front end of the first strap 11. This ring-shaped portion 11A passes between the base cloth 14C and the annular filler cloth 28 at the edge portion 26 of the vent hole 24. Through-holes 28A and 28B through which the ring-shaped portion 11A passes are provided near one another in the filler cloth 28. Incidentally, the slip knot is one type of knot that is tied with a rope. It is also known as a running knot, a slide knot, and a slipper knot.

The structure of the first straps 11 will now be described in more detail. To simplify the description, only one of these first straps 11 is described. The other first strap 11 is understood to have the same structure unless otherwise stated. A looped knot 11C, for example, is formed on the tip end of the first strap 11 that is inside the air bag 14 and near the through-hole 28B of the filler cloth 28. The first strap 11 is threaded through the through-hole 28B near the knot 11C and around the vent hole 24 in between the filler cloth 28 and the base cloth 14A that forms the side face 14C, such that it runs in a circle substantially once around the vent hole 24. The base end side of the first strap 11 exits the through-hole 28A into the inside of the air bag 14 again, passes through the looped knot 11C formed on the tip end of the strap 11, and extends toward the rear of the vehicle. Thus, the ring-shaped portion 11A is formed with the front end portion of the first strap 11.

Figure 4:
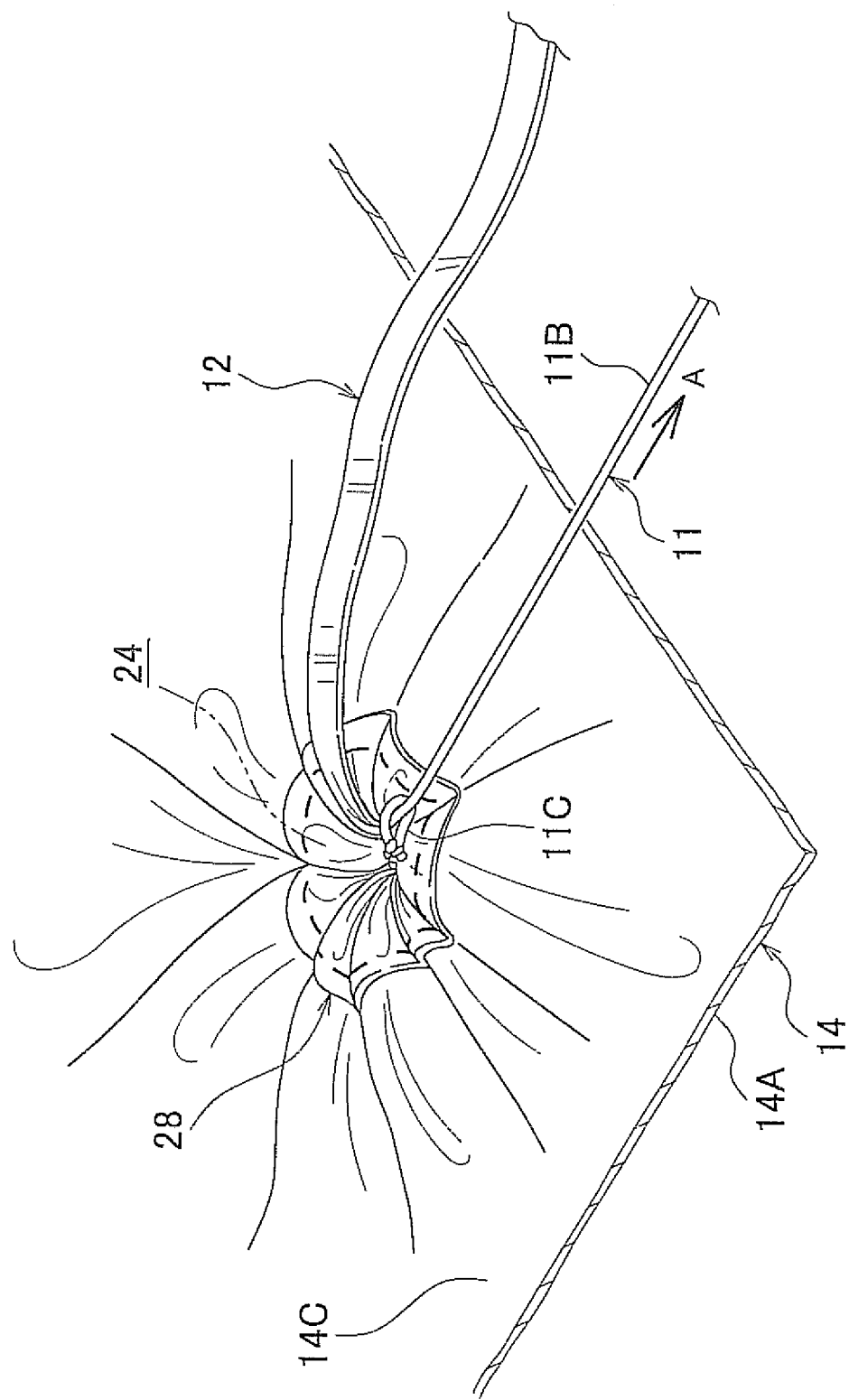
FIG. 4 shows an enlarged perspective view of the vent hole and the first and second straps when the vent hole has been closed from the state shown in FIG. 3 by the first strap being pulled.

In this description, the portion of the first strap 11 that is toward the rear of the ring-shaped portion 11A in the longitudinal direction of the vehicle will be designated as the main portion 11B. When this main portion 11B is pulled toward the rear of the vehicle (i.e., in the direction of arrow A in FIG. 4) as the air bag 14 inflates and deploys, as shown in FIG. 4, the ring-shaped portion of the slip knot constricts, thereby closing the vent hole 24.

Referring back to FIGS. 1 to 3, the second strap 12 is a non-elastic band-shaped body (hereinafter simply referred to as "band"), for example, which is connected to the edge portion 26 of the vent hole 24. When a passenger 32 wearing a seatbelt 30 is restrained by the air bag 14, this second strap 12 pulls on the edge portion 26 of the vent hole 24, as well as on the first strap 11 around the vent hole 24, thereby opening the vent hole 24.

Figure 7:
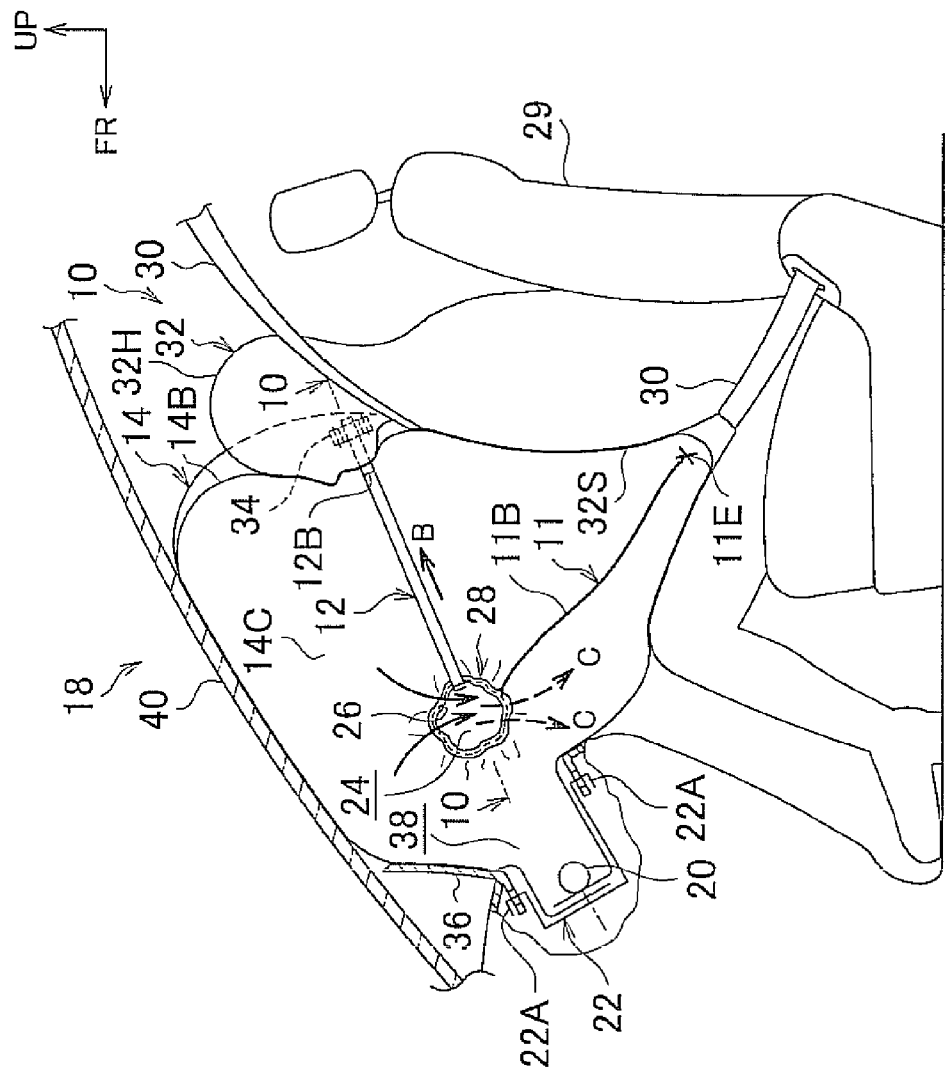
FIG. 7 shows a side view of a case in which the vent holes are opened by the second strap being pulled, such that gas inside the air bag escapes through the vent holes, when the upper body of passenger of average build is leaning forward in the longitudinal direction of the vehicle and restrained by the air bag.
Figure 8:
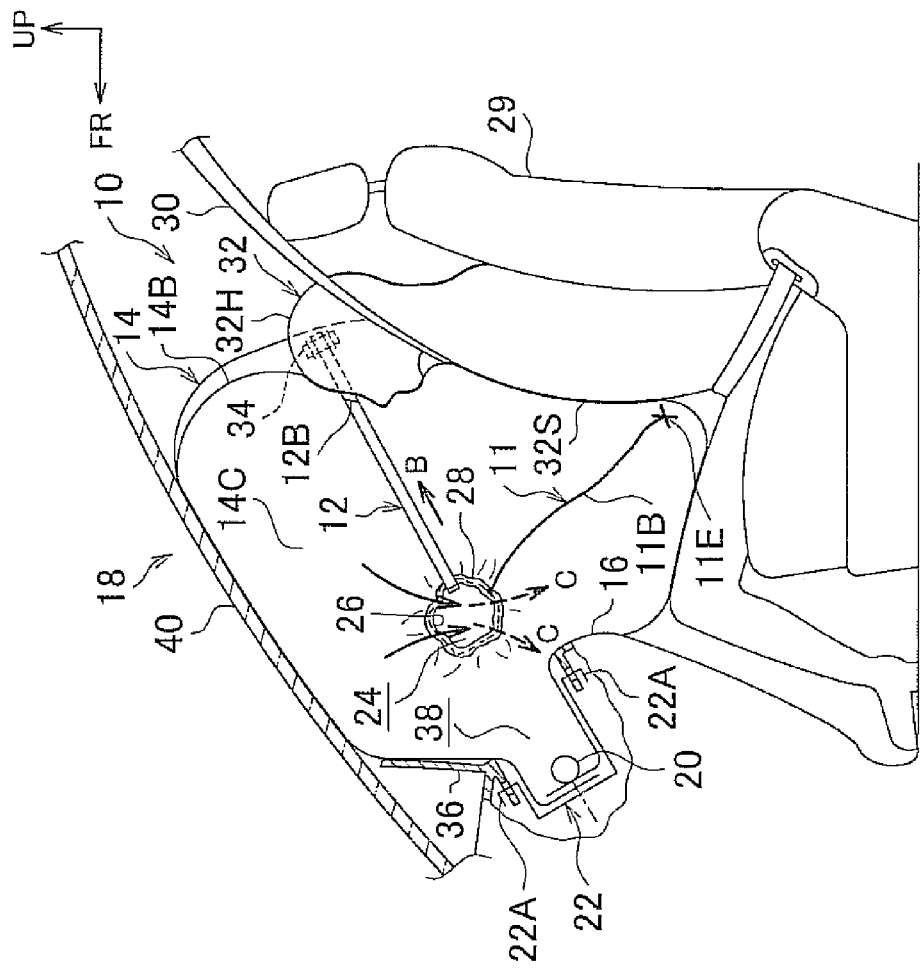
FIG. 8 shows a side view of a case in which the vent holes are opened by the second strap being pulled, such that gas inside the air bag escapes through the vent holes, when the upper body of a passenger of relatively small build is leaning forward in the longitudinal direction of the vehicle and restrained by the air bag.

As shown in FIG. 1, this second strap 12 extends in a general U-shape, when viewed from above the vehicle, along the rear face 14B and the side face 14C on both sides of the air bag 14 in the vehicle width direction, inside the air bag 14. The front end 12A on one side of the second strap 12 in the vehicle width direction is connected to the edge portion 26 of one vent hole 24, while the front end 12A on the other side of the second strap 12 in the vehicle width direction is connected to the edge portion 26 of the other vent hole 24 (see FIGS. 2 and 3). As shown in FIGS. 6 to 8, the rear portion 12B of the second strap 12 extends in the vehicle width direction along the inside surface of the rear face 14B at a height position where the occupant 32 wearing the seatbelt 30 will be restrained by the air bag 14.

When the passenger 32 is wearing the seatbelt 30, the pelvic area (i.e., the waist) of the passenger 32 is restrained so during a frontal collision of the vehicle 18, relative movement of the lower portion of the upper body of the passenger 32 in the forward direction of the vehicle is inhibited. Therefore, the upper body of the passenger 32 bends forward at the waist. The height position of the rear portion 12B of the second strap 12 is set taking into account the trajectory of the passenger 32, e.g., of the head 32H, at this time. Therefore, the height position where the passenger 32 wearing the seatbelt 30 is restrained by the air bag 14 refers to the height position where the head 32H of the passenger 32, for example, is restrained by the air bag 14. As shown in FIGS. 6 and 8, the passenger 32 may be either large or small so the height position where the head 32H is restrained by the air bag 14 is preferably set based on a person of average size.

Incidentally, the reference for the height position of the rear portion 12B of the second strap 12 is not limited to the height position where the head 32H is restrained by the air bag 14. Alternatively, the position where another portion of the upper body of the passenger 32 is restrained by the air bag 14 may be used as a reference, while making sure that the inertia force F (see FIG. 10) of the passenger 32 is effectively input to the second strap 12.

Figure 10:
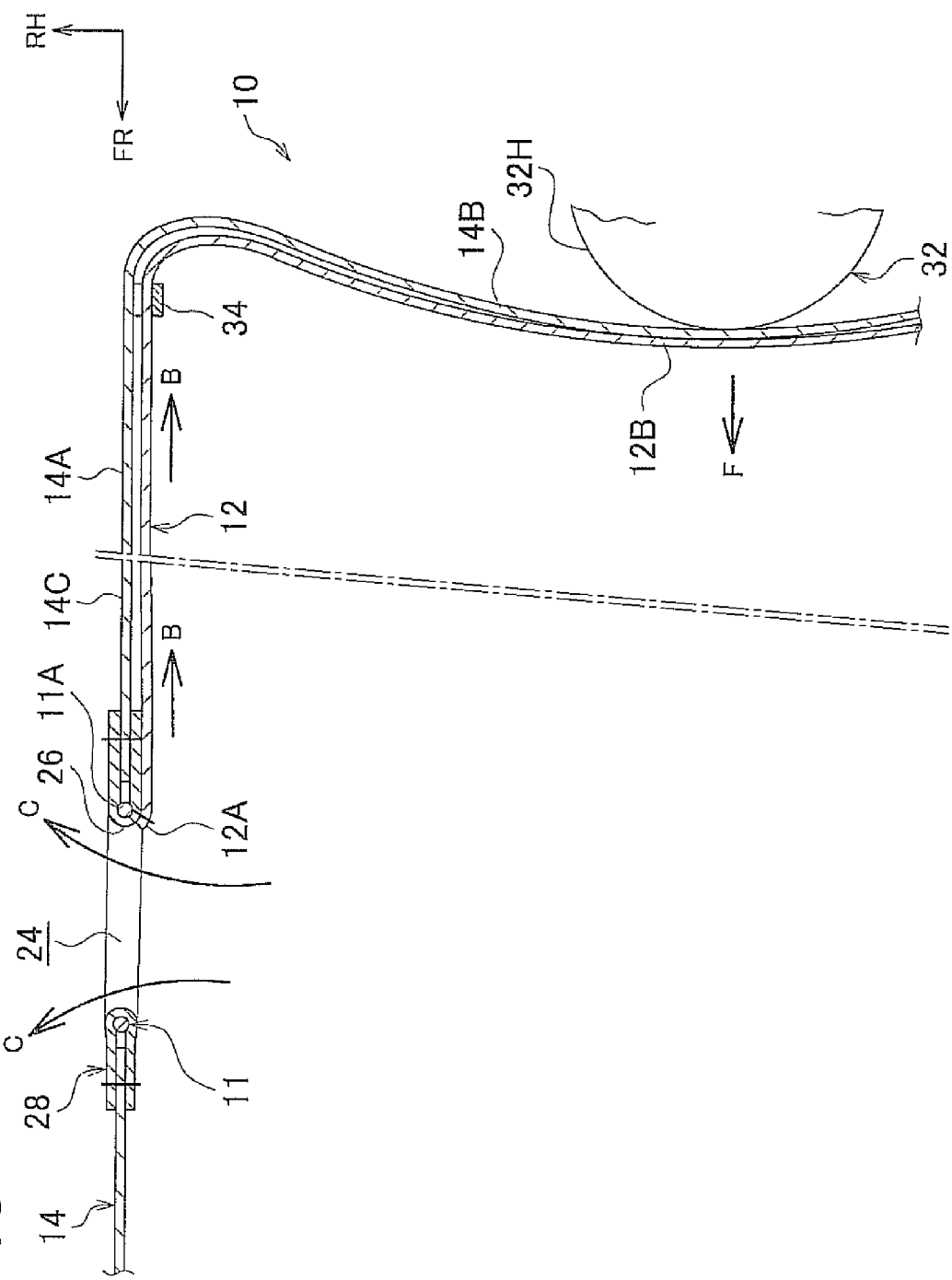
FIG. 10 shows an enlarged sectional view taken along line X-X in FIG. 7 of the vent hole of the air bag as it appears when open.

As shown in FIG. 10, a guide portion 34 is provided on the inside of the side face 14C in a position to the rear of the vent hole 24 in the longitudinal direction of the vehicle. This guide portion 34 guides the second strap 12 so that the portion of the second strap 12 that faces the side face 14C is pulled toward the rear in the longitudinal direction of the vehicle (i.e., in the direction of arrow B) when the passenger 32 wearing the seatbelt 30 (see FIG. 6 etc.) is restrained by the air bag 14. This guide portion 34 is a belt loop that is made of the same fabric as the base cloth 14A of the air bag 14, for example. In this example, one guide portion 34 is provided on each side face 14C. Also, the guide portion 34 is arranged so as to straddle the second strap 12 in the vertical direction of the vehicle, with the upper end of the guide portion 34 being sewn to the base cloth 14A above the second strap 12 and the lower end of the guide portion 34 being sewn to the base cloth 14A below the second strap 12. Incidentally, the guide portion 34 is preferably arranged as far toward the rear as possible on the side face 14C of the air bag 14 in the longitudinal direction of the vehicle, i.e., at a location near the rear face 14B. This is done so that when the passenger 32 wearing the seatbelt 30 is restrained by the air bag 14, the edge portion 26 of the vent hole 24 and the first strap 11 (i.e., the ring-shaped portion 11A) around the vent hole 24 will quickly be pulled far enough toward the rear of the vehicle to properly open the vent hole 24.

When the vent hole 24 is closed, the front end 12A of the second strap 12 is pulled an amount equivalent to approximately the radius of the vent hole 24 toward the front of the vehicle. Therefore, the second strap 12 is provided extra long (i.e., with an extra long portion, not shown) considering this amount of pull so that the second strap 12 does not impede the inflation and deployment of the air bag 14.

Next, the operation of the front passenger seat air bag apparatus of this example embodiment structured as described above will be described. As shown in FIG. 6, with the front passenger seat air bag apparatus 10 according to this example embodiment, if the vehicle 18 is involved in a frontal collision and the air bag ECU determines that the collision has occurred based on a signal from an impact sensor, not shown, the air bag ECU sends an activation current to the inflator 20. Upon receiving this activation current, the inflator activates, discharging a large amount of gas which is supplied to the air bag 14, and as a result, the air bag 14 begins to inflate.

The inflation pressure of the air bag 14 at this time is applied to the door substrate, not shown, positioned at the open portion of the module case 22, and the instrument panel 16. When this inflation pressure becomes equal to or greater than a predetermined value, the door substrate will tear along a tear line, not shown, and rupture. As the door substrate ruptures, part of the instrument panel 16 also ruptures. As a result, the door substrate and the part of the instrument panel 16 become an air bag door 36, and the air bag 14 deploys upward in the vertical direction of the vehicle, for example, such that an open portion 38 is formed in the instrument panel 16. The air bag 14 balloons out from within the instrument panel through this open portion 38 toward the passenger 32, and starts to deploy into the space between the front windshield 40, the instrument panel 16, and the passenger 32.

Figure 9:
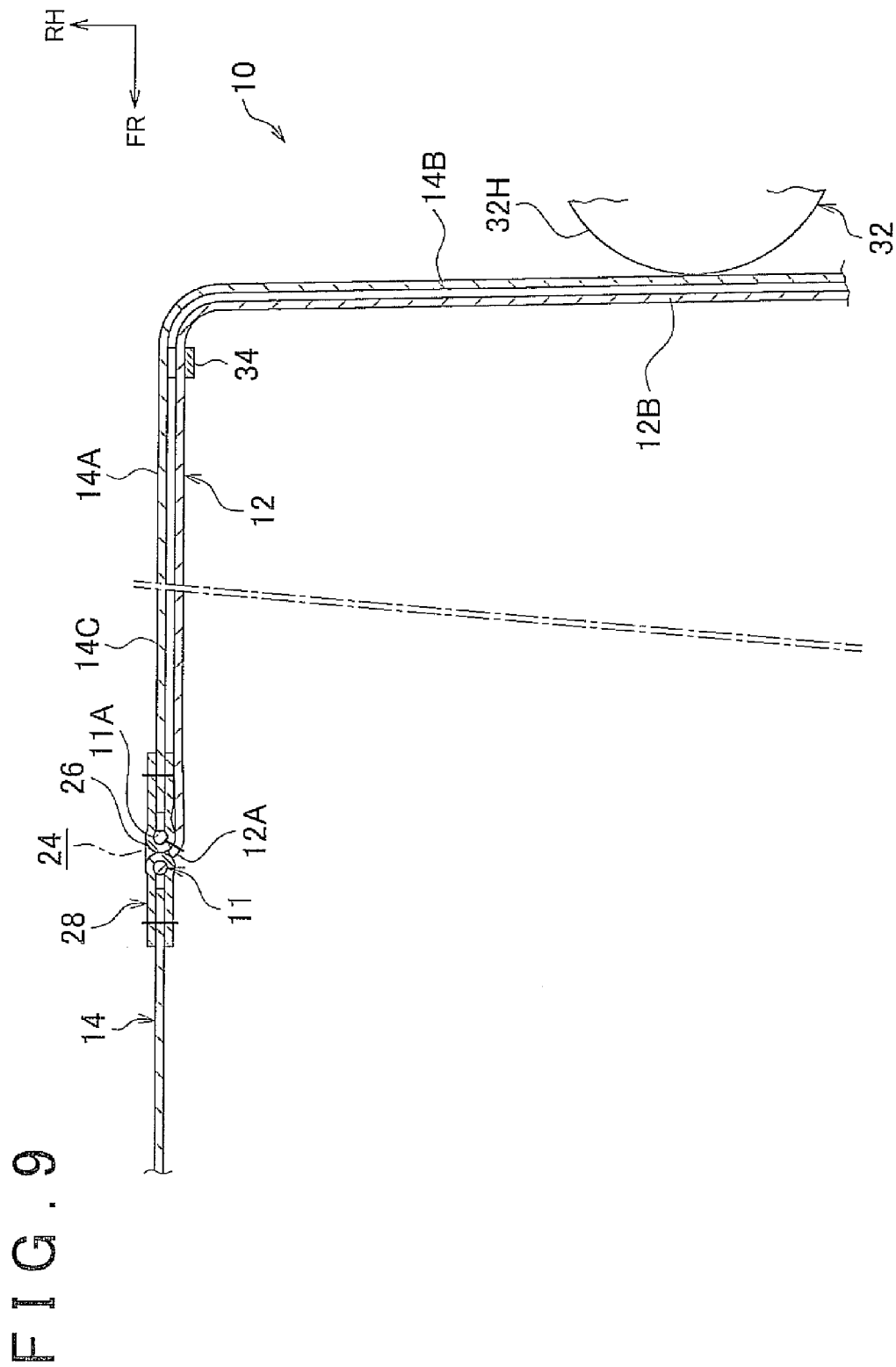
FIG. 9 shows an enlarged sectional view taken along line IX-IX in FIG. 6 of the vent hole of the air bag as it appears when closed.

At this time, as the air bag 14 inflates, the vent hole 24 starts to close (see FIG. 9 as well) from the first strap 11 which is connected to the area around the vent hole 24 and the rear lower portion of the side face 14C of the base cloth 14A of the air bag 14. More specifically, the rear end 11E of the first strap 11 is connected to the rear lower portion of the side face 14C of the air bag 14, so as the air bag 14 deploys, the main portion 11B of the first strap 11 is pulled in the direction of arrow A. Meanwhile, as shown in FIGS. 2 and 3, the ring-shaped portion 11A which is formed by a slip knot is provided on the front end of the first strap 11, and this ring-shaped portion 11A passes between the base cloth 14A and the filler cloth 28 at the edge portion 26 of the vent hole 24. Therefore, when the main portion 11B is pulled toward the rear of the vehicle (i.e., in the direction of arrow A), the ring-shaped portion 11A of the slip knot constricts, thereby closing the vent hole 24, as shown in FIG. 4.

As the vent hole 24 closes, it becomes difficult for the gas supplied into the air bag 14 to escape. Therefore, when a passenger 32 seated in the front passenger seat 29 is not wearing the seatbelt 30 in a country or region where it is not mandatory to wear a seatbelt in the front passenger seat 29, a sufficient amount of reaction force against the passenger 32 is able to be ensured to appropriately restrain the passenger 32 (this restrained state is not shown in the drawings).

Meanwhile, as shown in FIG. 6, when the passenger 32 seated in the front passenger seat 29 is wearing the seatbelt 30 and that passenger 32 is restrained by the air bag 14, the second strap 12 pulls on both the edge portion 26 of the vent hole 24 and the first strap 11, thereby reopening the vent hole 24 that had been closed, or in the process of being closed, by the operation of the first strap 11.

More specifically, the rear portion 12B of the second strap 12 extends in the vehicle width direction along the inside surface of the rear face 14B at a height position where the head 32H of the passenger 32 wearing the seatbelt 30 will be restrained by the air bag 14. Therefore, when the head 32H of the passenger 32 is restrained by the air bag 14, the inertia force F (see FIG. 10) of the upper portion of the upper body of the passenger 32 will be directly input into the second strap 12.

Also, the guide portion 34 that guides the second strap 12 is provided on the inside of the side face 14C in a position that is farther toward the rear than the vent hole 24 in the longitudinal direction of the vehicle. Therefore, as shown in FIG. 10, even if the rear face 14B is pushed forward in the longitudinal direction of the vehicle from the inertia force F of the upper portion of the upper body of the passenger 32, the portion of the second strap 12 that is positioned on the side face 14C of the air bag 14 will be smoothly pulled toward the rear of the vehicle (i.e., in the direction of arrow B).

Figure 5:
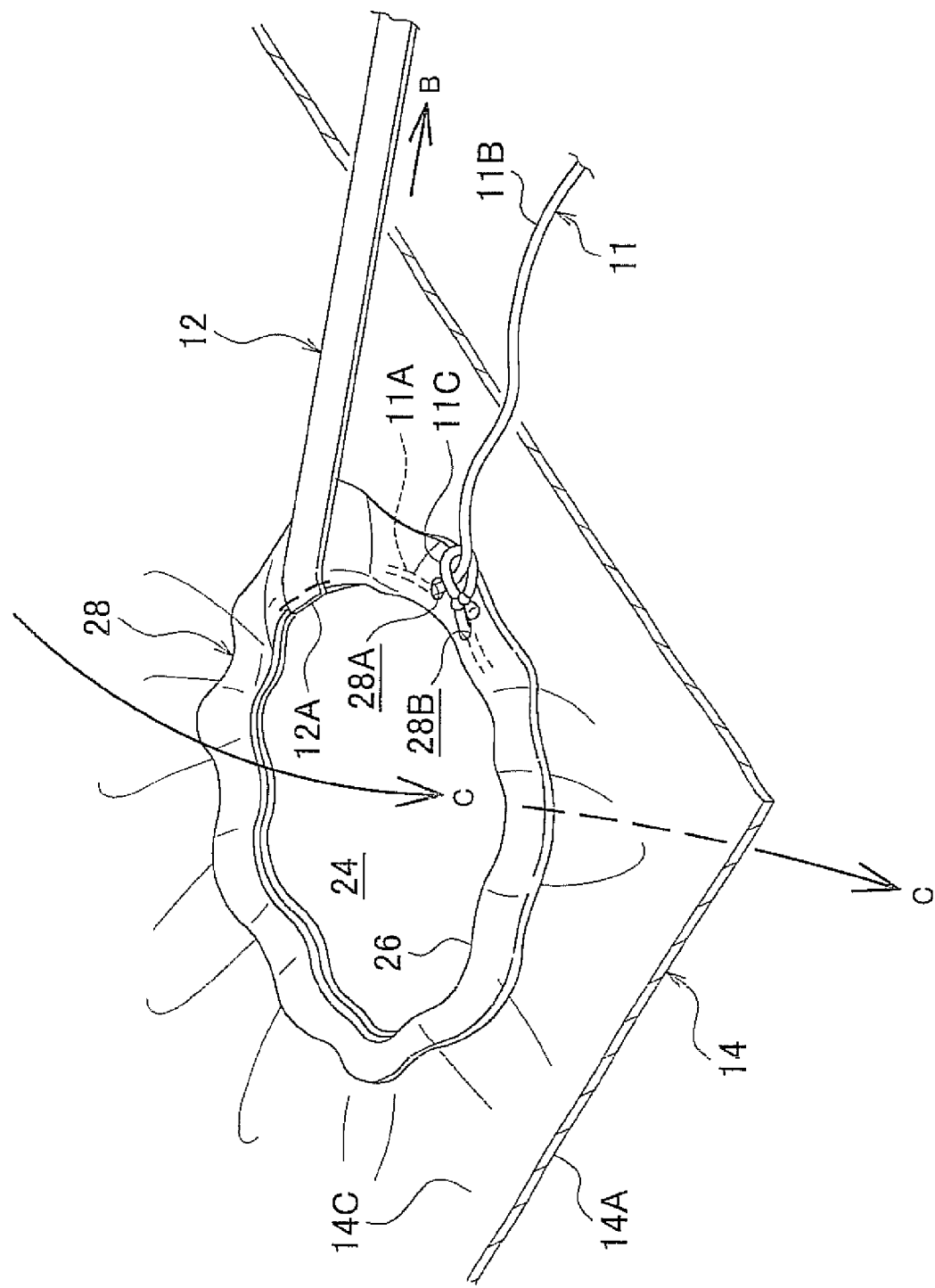
FIG. 5 shows an enlarged perspective view of the vent hole and the first and second straps when the vent hole has been opened from the state shown in FIG. 4 by the second strap being pulled.

In this example embodiment, in this way, as shown in FIGS. 5, 7, and 10, the second strap 12 is able to pull hard on the edge portion 26 of the vent hole 26 and the ring-shaped portion 11A of the first strap 11, and the operation of the second strap 12 is smoother. Also, the vent hole 24 that had been closed, or in the process of being closed, by the operation of the first strap 11 can be opened quickly as a result. Incidentally, because the ring-shaped portion 11A of the first strap 11 is formed in a slip knot, the first strap 11 that had closed the vent hole 24 can easily be loosened by pulling on the ring-shaped portion 11A with the second strap 12.

Accordingly, gas inside the air bag 14 is able to easily escape through the vent hole 24 in the direction of arrow C. Therefore, when the passenger 32 that is seated in the front passenger seat 29 is wearing the seatbelt 30, the reaction force against the passenger 32 can be reduced, thereby enabling the passenger 32 to be properly restrained.

In this way, with the front passenger seat air bag apparatus 10 according to this example embodiment, the reaction force of the air bag 14 when restraining the front seat passenger 32 can be made appropriate, regardless of whether the passenger 32 is wearing the seatbelt 30. In other words, the front passenger seat air bag apparatus 10 is able to be response appropriately when the passenger 32 is wearing the seatbelt 30, as well as when the passenger 32 is not wearing the seatbelt 30.

Although FIG. 7 shows a case with a passenger 32 of average build (i.e., stature). However, as shown in FIG. 8, with a passenger 32 of relatively small build who closer to the instrument panel 16 as well, the reaction force against the passenger 32 can be reduced by opening the vent hole 24 of the air bag 14, so the passenger 32 is able to be properly restrained.

Incidentally, with the structure described above, the rear end 11E of the first strap 11 is connected to the air bag 14 at the rear lower portion of the base cloth 14A of the side face 14C. Alternatively, however, the rear end 11E of the first strap 11 may be connected to the air bag 14 at the lower portion of the base cloth 14A of the rear face 14B that faces the passenger 32 when the air bag 14 is deployed. That is, the location where the rear end 11E of the first strap 11 is connected to the air bag 14 is not limited as long as it is a location that enables the first strap 11 to be pulled enough to close the vent hole 24 when the air bag 14 is completely deployed.

Also, the rear portion 12B of the second strap 12 is not limited to being a thin band-shaped member as shown in the drawings. For example, the rear portion 12B of the second strap 12 may also be wider in the vertical direction of the vehicle because the inertia force of the passenger 32 is able to be stably and efficiently input by the second strap 12 when the passenger 32 is restrained by the air bag 14. Also, in the example shown in the drawings, only one second strap 12 is used, with the front end 12A on one side in the vehicle width direction being connected to the edge portion 26 of the vent hole 24 on the left and the front end 12A on the other side in the vehicle width direction being connected to the edge portion 26 of the vent hole 24 on the right. However, the invention is not limited to this. For example, the second strap 12 may be divided near the center of the rear portion 12B in the vehicle width direction, and the rear ends of the second straps 12 in the vehicle width direction connected to the rear face 14B of the base cloth 14A.

Moreover, the guide portion 34 is not limited to a belt loop structure as shown in the drawings, as long as it is able to smoothly guide the second strap 12.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A front passenger seat air bag apparatus comprising:
an air bag which is housed folded inside an instrument panel, and inflates and deploys toward a passenger who is seated in a front passenger seat with a supply of gas during a frontal collision of a vehicle, and which has a vent hole of which the state is switched between an open state and a closed state;
a first strap which is connected to both an area around the vent hole and a lower portion of a passenger-side base cloth of the air bag, and which closes the vent hole as the air bag inflates and deploys; and
a second strap which is connected to an edge portion of the vent hole, and pulls on the edge portion of the vent hole and on the first strap around the vent hole so as to open the vent hole when the passenger who is wearing a seatbelt is restrained by the air bag.

2. The front passenger seat air bag apparatus according to claim 1, wherein
the front portion of the first strap is connected to the area around the vent hole by a slip knot.

3. The front passenger seat air bag apparatus according to claim 1, wherein
an annular filler cloth is sewn to the edge portion of the vent hole provided in the base cloth of the air bag, and the first strap passes between the base cloth and the filler cloth.

4. The front passenger seat air bag apparatus according to claim 3, wherein
a through-hole is provided in the filler cloth, and the first strap is inserted through the through-hole, passes around the vent hole, and comes back out through the through-hole.

5. The front passenger seat air bag apparatus according to claim 4, wherein
the through-hole includes at least two through-holes, and the first strap is inserted through one of the through-holes and comes out through the other through-hole.

6. The front passenger seat air bag apparatus according to claim 3, wherein
a loop portion is provided at one end of the first strap, and the other end of the first strap passes through the loop portion.

7. The front passenger seat air bag apparatus according to claim 1, wherein a rear portion of the second strap extends in the vehicle width direction along an inside surface of the passenger-side base cloth, at a height position where the passenger who is wearing the seatbelt is restrained by the air bag.

8. The front passenger seat air bag apparatus according to claim 7, wherein:
the vent hole is provided in a side portion of the air bag in the vehicle width direction in a deployed state; and
a guide portion, which provides guidance such that a portion of the second strap which is positioned at the side portion is pulled toward the rear of the vehicle when the passenger who is wearing the seatbelt is restrained by the air bag, is provided on an inside surface of the side portion in a position that is farther toward the rear of the vehicle than the vent hole.

9. The front passenger seat air bag apparatus according to claim 7, wherein
the rear portion of the second strap is positioned at a height where the head of the passenger who is wearing the seatbelt strikes the air bag.

10. The front passenger seat air bag apparatus according to claim 1, wherein:
the vent hole is provided in a side portion of the air bag in the vehicle width direction in a deployed state; and
a guide portion, which provides guidance such that a portion of the second strap which is positioned at the side portion is pulled toward the rear of the vehicle when the passenger who is wearing the seatbelt is restrained by the air bag, is provided on an inside surface of the side portion in a position that is farther toward the rear of the vehicle than the vent hole.

11. The front passenger seat air bag apparatus according to claim 10, wherein
the guide portion is arranged so as to straddle the second strap in the vertical direction of the vehicle, and both ends of the guide portion in the vertical direction of the vehicle are fixed to the side face of the base cloth.

12. The front passenger seat air bag apparatus according to claim 1, wherein the lower portion is disposed rearward in the longitudinal direction of the vehicle.

* * * * *